Aug. 20, 1974  O. A. BECKFORD  3,830,703
ENTERIC BACILLI DIFFERENTIAL APPARATUS
Filed Feb. 2, 1973  3 Sheets-Sheet 1
FIG. 1
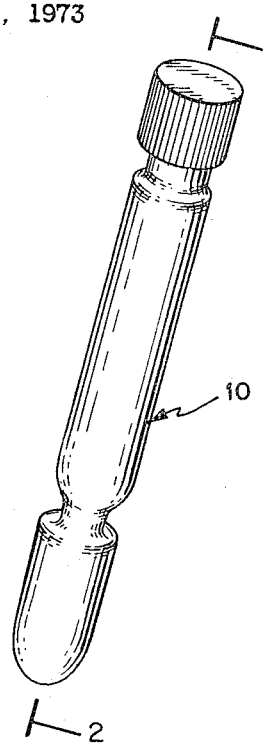
FIG. 2
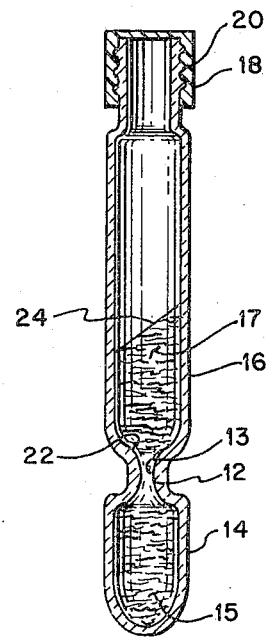
LOCATION OF REACTIONS
THE EXPANDERS
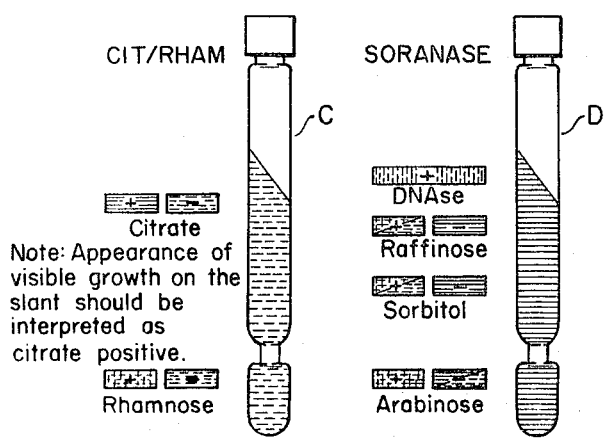
FIG. 4
BASIC SYSTEM
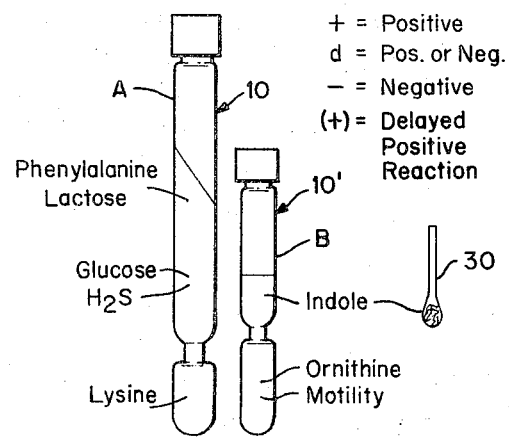
+ = Positive
d = Pos. or Neg.
− = Negative
(+) = Delayed Positive Reaction
FIG. 3

Aug. 20, 1974          O. A. BECKFORD          3,830,703

ENTERIC BACILLI DIFFERENTIAL APPARATUS

Filed Feb. 2, 1973          3 Sheets-Sheet 2

STEP 3
If Slant is Purple or Yellow and H₂S is Negative — READ INDOLE TEST — FIG. 6

Pink Swab Denotes Positive Indole
this is the E. COLI-SHIGELLA Group

E. coli may be positive or negative in its ornithine, lysine, lactose and motility reactions.
Note: 60% Shigella are indole negative. Colony morphology, negative lysine, negative motility, lack of gas, will indicate Shigella. (Serotype.) Some Klebsiella are indole positive.

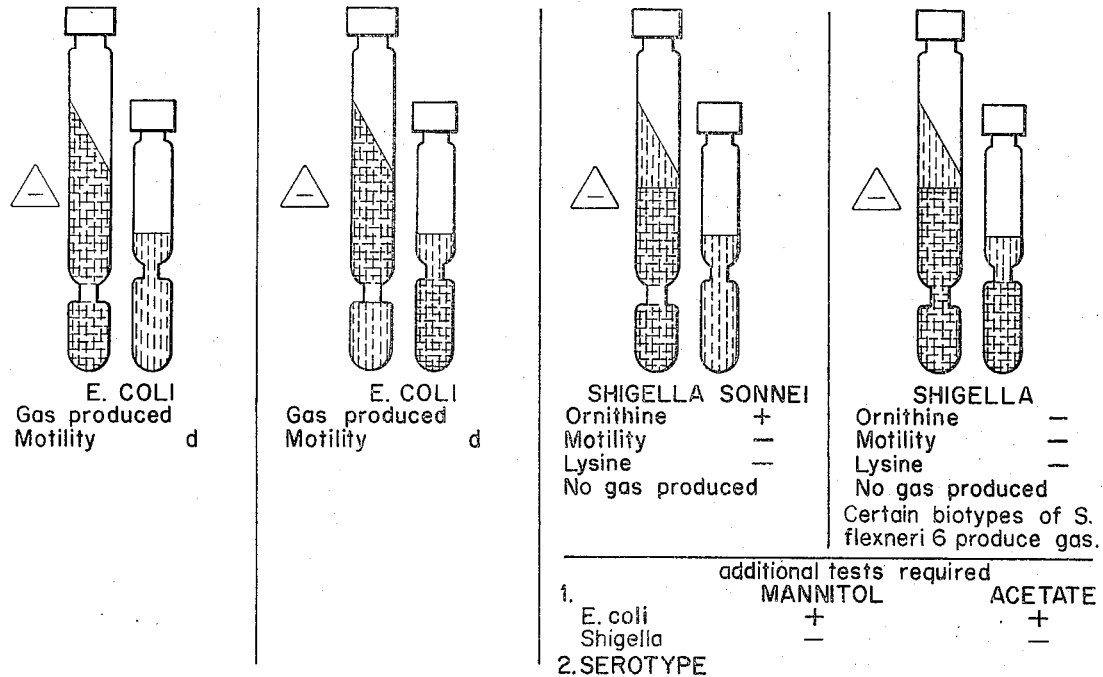

E. COLI
Gas produced
Motility          d

E. COLI
Gas produced
Motility          d

SHIGELLA SONNEI
Ornithine       +
Motility         —
Lysine           —
No gas produced

SHIGELLA
Ornithine       —
Motility         —
Lysine           —
No gas produced
Certain biotypes of S. flexneri 6 produce gas.

additional tests required

|   | MANNITOL | ACETATE |
|---|---|---|
| 1. E. coli | + | + |
| Shigella | — | — |

2. SEROTYPE

---

Yellow Swab Denotes Negative Indole
this is the KLEBSIELLA-ENTEROBACTER-SERRATIA Group A few Klebsiella will be indole positive. In such cases their colony morphology, coupled with their r/b reactions (i.e. non-motile, negative ornithine), will indicate the organism to be an indole positive Klebsiella.

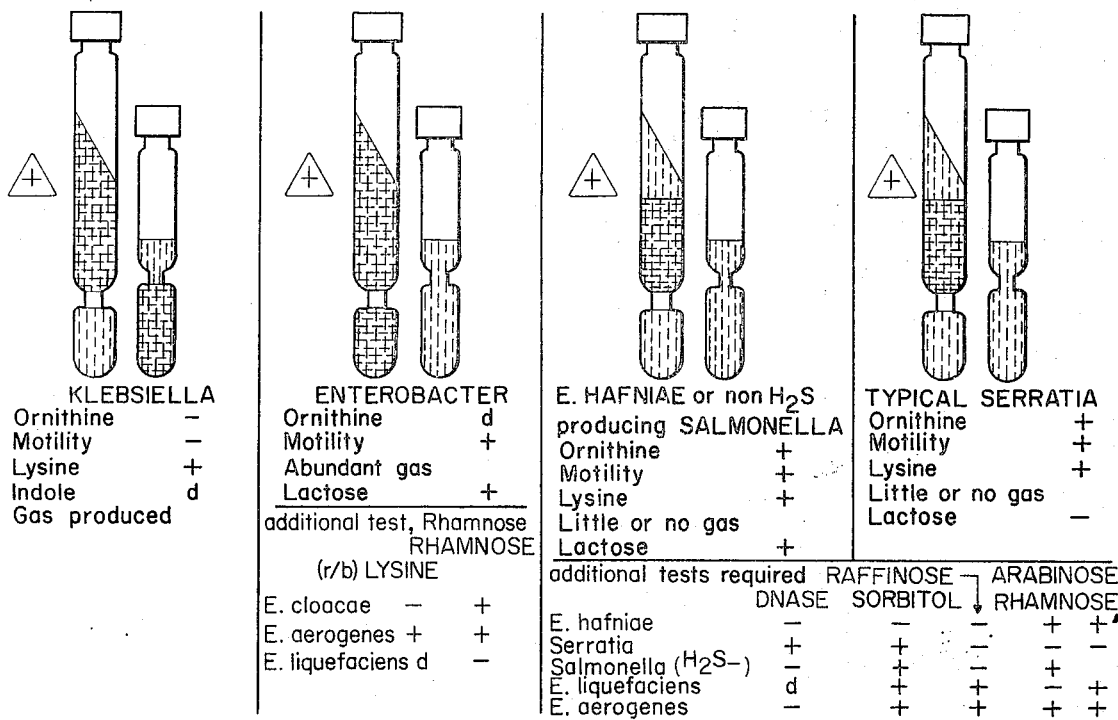

KLEBSIELLA
Ornithine    —
Motility       —
Lysine        +
Indole        d
Gas produced

ENTEROBACTER
Ornithine    d
Motility       +
Abundant gas
Lactose      + additional test, Rhamnose
RHAMNOSE (r/b) LYSINE

| | | |
|---|---|---|
| E. cloacae | — | + |
| E. aerogenes | + | + |
| E. liquefaciens | d | — |

E. HAFNIAE or non H₂S producing SALMONELLA
Ornithine       +
Motility          +
Lysine           +
Little or no gas
Lactose        +

TYPICAL SERRATIA
Ornithine    +
Motility       +
Lysine        +
Little or no gas
Lactose      — additional tests required

| | RAFFINOSE | DNASE | SORBITOL | ARABINOSE | RHAMNOSE |
|---|---|---|---|---|---|
| E. hafniae | — | — | — | + | + |
| Serratia | + | + | — | — | — |
| Salmonella (H₂S—) | — | + | — | + | — |
| E. liquefaciens | d | + | — | + | + |
| E. aerogenes | + | — | + | + | + |

United States Patent Office
3,830,703
Patented Aug. 20, 1974

3,830,703
ENTERIC BACILLI DIFFERENTIAL APPARATUS
Orville A. Beckford, Port Washington, N.Y., assignor to Diagnostic Research, Inc., Roslyn, New York
Filed Feb. 2, 1973, Ser. No. 329,176
Int. Cl. C12k 1/10
U.S. Cl. 195—127     9 Claims

ABSTRACT OF THE DISCLOSURE

This enteric differential apparatus combines fourteen recognized biochemical parameters in a four-tube culture media in such a manner that each individual species within the family Enterobacteriaceae causes the media to assume a distinctive appearance. Two tubes comprise the basic R/B differential system. Two additional tubes comprise an expander set. One or both of the expander tubes may be used in combination with the basic system. A unique tube facilitates inoculation, separates culture media components to prevent interaction, thus increasing shelf life, provides sharp differentiation between reactions and permits the use of semi-solid gels to obtain more sensitive determination of motility. The tube may be used for other culture media tests. Another advantage is that the tube permits transportation of semi-solid gel media without breakup.

---

The aforementioned Abstract is neither intended to define the invention of the application which, of course, is measured by the claims, nor is it intended to be limiting as to the scope of the invention in any way.

BACKGROUND OF THE INVENTION

For many years microbiologists throughout the world have been identifying Enterbacteriaceae by a combination of colony morphology, biochemical reactions and serology. The biochemical aspects of the identification creates the greatest burden in work application in the clinical laboratory. Several tubes of media are required for proper biochemical determination and as many as eighteen individual tubes are recommended by the governmental agencies. To overcome this task and alleviate the tremendous number of tubes required, clinical laboratories have designed their own initial secreening system using four to six tubes. The ones most commonly encountered are TSI, Kliglers or Russels double sugar, Simmons Citrate, MR-VP, KCN, Urea, Phenylalanine, Malonate, SIM, Lactose, Glucose and Maltose.

The initial screening most often requires many additional biochemical tests and the choice and judgment used depending on the level of the technology requires 72 hours or more for proper identification of the organism.

In the copending application of Rollender and Beckford, Ser. No. 14,805, filed Mar. 2, 1970, there was disclosed a system known commercially as the R/B (Rollender/Beckford) system. This prior system standardizes the initial screening system by establishing a constant and reduced the number of tubes required to two. It was established that biochemical reactions in combination could compare favorably with individual biochemical determinations. However, it was found that in many cases it was desirable to be able to simultaneously speciate within the groups and detect the rarer atypical organisms. Accordingly, two tubes were added to the system which achieve this goal.

The prior art apparatus was subject to limited shelf life and it was found that diffusion problems existed, which created ambiguous readings. The present application discloses a tube designed to eliminate these problems.

SUMMARY OF THE INVENTION

The present system employs constricted tubes. The constriction is about 1 inch from the bottom of the tubes, 2 mm. in internal diameter and 4 mm. in length. Preferably, the constriction is tapered and in cross-section resembles a pair of opposed arcs. The two mm. internal diameter permits the entrapment of an Air Bubble. This physical separation of the two media, arrested diffusion, prolonged shelf life and resulted in cleaner sharper color reactions. The test media contained in three or four such tubes is described more fully hereinafter.

DESCRIPTION OF THE DRAWING

FIG. 1 is a perspective view of the media tube of this invention;
FIG. 2 is a sectional view taken along lines 2—2 of FIG. 1;
FIG. 3 is a schematic showing of a set of tubes containing diagnostic media with legends indicating areas where particular results are to be observed;
FIG. 4 is a schematic showing of a set of tubes containing diagnostic media with legends indicating areas where particular results are to be observed;
FIG. 6 is a schematic showing of step 3 of the test.

DESCRIPTION OF PREFERRED EMBODIMENT

Figure 5:
FIG. 5 is a schematic showing of steps 1 and 2 of a test for differentiating enteric bacteria using the tubes of FIG. 4.

A tube 10 made of transparent glass or synthetic resin is used to contain the test media. The tube is distinguished by a constricted connecting passage 12 about 4 mm. long and about 2 mm. wide. Preferably the constriction is in the form of opposed arcs as viewed in cross-section. The lower portion 14 is used for one media formulation 15 while the upper portion 16 is used for a different formulation 17. The passage 12 may be filled with a sterile gas or fluid such as oil to prevent interaction between formulations 15, 17. A screw cap 18 is provided which mates with threads 20. In a particular test system described hereinafter a set of four tubes is employed, tubes B, C and D being slightly smaller than tube A.

Description of the tubes

Tube A: The lower butt portion of the tube is filled with a gel containing lysine and means for the detection of the decarboxylation of the lysine in the presence of bacilli causing the decarboxylation of the lysine.

The upper butt portion is then filled with a gel, non-toxic to bacteria, for which the test is to be made and having dispersed in the gel the following:

(1) sufficient nutrient to support the growth of bacilli to be differentiated;
(2) sufficient amino acid and a sufficient source of available iron to provide an indication of deamination of the amino acid by selected bacilli. The iron may be supplied in the form of ferrous sulphate, ferris ammonium citrate or combinations thereof;
(3) sufficient carbohydrate to provide an indication of fermentation and to act as a catalyst for decarboxylation;
(4) sufficient electrolyte to permit the flow of ions through the gel;
(5) a source of sulphur for enhancing production of $H_2S$ in the presence of selected bacilli; and
(6) a pH indicator.

Tube B: In the smaller tube there is provided means for the detection of indole produced by selected bacilli as well as orinthine decarboxylation and motility. In the past it was necessary to utilize a high concentration of agar in the gel to provide sufficient rigidity to prevent break-up during shipment. The rigid gel is relatively insensitive to motility. By reducing the percentage of agar present from the prior 0.4% to 0.3%, a much more reliable and easily read motility test is provided.

Motility in the tube B is read as positive when the appearance is cloudy making the stab line barely visible. It is also positive when, though not particularly cloudy, there is evidence of growth progressing in all directions completely around the stab line.

Motility is read as negative when the appearance is clear making the stab line produced by the inoculation wire clearly visible. It is also negative when there is appearance of growth in one or two directions only from the stab line which is due to gas production, causing a hairline split in the media which introduces growth of organisms in the split.

The indole test is carried out by wetting a swab 20 in indole reagent and then touching the wetted swab to the media surface of the tube B. If positive, the swab will turn pink; if negative, the swab remains yellow. This is shown in FIG. 6.

It will be noted from FIG. 5 that the reaction for *Proteus rettgeri* and Providencia are similar and accordingly and additional test is required to distinguish between them. This further test is carried out in Tube C. Typically sixty-eight percent of *Proteus rettgeri* will provide a positive reaction in lower portion of Tube C which contains Rhamnose. Accordingly, a positive reaction is a definitive indication. If, however, a negative reaction results, a further test is made employing Urease to distinguish between *P. rettgeri* and Providencia. The urease test is a standard test which does not form part of this invention. Thus, by inoculating Tube C at the same time as Tubes A and B, a day of testing may be saved.

To further differentiate the Enterobacter-Serratia Group, which includes those bacteria characterized by negative lactose, positive lysine, negative indole response and positive ornithine response, tube D is employed. It should be noted that $H_2S$ negative *Salmonella masquerades* in this group.

The reactions taking place in tubes C and D are shown in FIG. 4.

General Test Procedure

To inoculate the media, a four-inch inoculation wire with a flattened loop (needle eye) terminus is flame sterilized, allowed to air cool, and then touched to the center of a selected, well isolated colony growing on an appropriate primary plating media. The needle is stabbed into the bottom of the tube. The tapered portion 22 serves to guide the needle into the lower butt portion 14. An important advantage of the guide is that the inoculation always takes place in the center of the media mass providing uniformity between tests.

As the needle is withdrawn, it is gently streaked with a back-and-forth movement across the slant surface 24. The needle is then jabbed into the butt of a smaller tube 10′.

The tubes are then incubated at 37° C. for 18 to 24 hours with caps 18 loosely positioned to allow air to enter for the aerobic reactions to take place.

Detailed Procedure

I. A sample to be diagnosed, such as feces or urine, is swabbed on to an enteric isolation medium, i.e., MacConkey, EMB, XLD. The plates are streaked starting in the swabbed area and moving out into the uninoculated portions of the plate in a pattern that creates a dilution of the sample and promotes growth of tiny isolated colonies of bacteria $B_1$, $B_2$, etc.

II. The inoculated plates are then incubated at 37° C. for a period of 24 hours.

III. A 4″ flattened loop is flamed and allowed to air cool and then touched to the center of a well-isolated colony on the incubated plate. The standard oxidase test is performed. If a negative result is obtained, the organism is tested for the differentiation of Enterobacteriaceae.

IV. The large tube is inoculated to the bottom and the slant streaked lightly on withdrawal of the loop. Without reflaming loop, the small tube B is inoculated by stabbing to the bottom leaving a clean stab line. Tubes C and D are then inoculated without reflaming in the same manner as Tube A.

V. The inoculated tubes are then incubated at 37° C. for 18 and not more than 24 hours with loose caps.

VI. The tubes are then read.

If a brown slant appears, a positive phenylalanine is indicated showing the presence of the Proteus-Providencia Group. Species within this group can be identified by the following:

*Proteus vulgaris:*
$H_2S$ ---------------------------------- +
Ornithine ------------------------------- −

*Proteus mirabilis:*
$H_2S$ ---------------------------------- +
Ornithine ------------------------------- +
Indole ---------------------------------- −

*Proteus morganii:*
$H_2S$ ---------------------------------- −
Ornithine ------------------------------- +
Indole ---------------------------------- +

NOTE: Check indole for non $H_2S$ producing *P. mirabilis*.

*Proteus rettgeri:*
$H_2S$ ---------------------------------- −
Ornithine ------------------------------- −
Urease ---------------------------------- +

Providencia:
$H_2S$ ---------------------------------- −
Ornithine ------------------------------- −
Urease ---------------------------------- −

In FIG. 3, there is shown the location of the reactions in tubes A and B. The slant portion of the A tube upper section contains phenylalanine and lactose, the lower portion of the upper section provides glucose and $H_2S$ while the lower chamber 14 contains a lysine test. The B tube upper chamber contains indole and the lower chamber 14 an ornithine motility test.

In FIG. 4 there is shown the locations of the reactions in tubes C and D.

In FIGS. 5 and 6 the citrate reaction is shown within the triangles, while the tests of tube D are shown at the bottom of FIG. 6. The latter tests may be summarized as follows:

|  | E. aerogenes | E. cloacae | E. liquefaciens | Serratia | E. hafniae | $H_2S$ negative Salmonella |
|---|---|---|---|---|---|---|
| Lysine | + | − | d | + | + | + |
| Citrate | + | + | + | + | −/(+) | + |
| Rhamnose | + | + | − | − | + | + |
| DNAse | − | − | d | + | − | − |
| Raffinose | + | + | d | − | − | − |
| Sorbitol | + | + | + | + | − | + |
| Arabinose | + | + | + | − | + | + |

NOTE.—d = + or −. + = Positive reaction. − = Negative reaction +) = Delayed positive reaction.

Tube A—Butt Portion

| | |
|---|---|
| Peptone | 15.0 parts±1.0 by weight. |
| Yeast extract | 3.0 parts±2.0 by weight. |
| Phenylalanine | 3.0 parts±0.5 by weight. |
| Tryptophan | 2.0 parts±0.5 by weight. |
| Dextrose | 1.0 parts±0.5 by weight. |
| Lactose | 10.0 parts±1.0 by weight. |
| Sodium chloride | 5.0 parts±1.0 by weight. |
| Ferric ammonium citrate | 0.5 parts±0.5 by weight. |
| Sodium thiosulfate | 0.5 parts±0.5 by weight. |
| Agar | 15.0 parts±1.0 by weight. |
| Brom Cresol-Purple | 0.02 parts±0.001 by weight. |
| Water | 1000 parts by weight. |

Tube A—Slant Portion

| | |
|---|---|
| Peptone | 5.0 parts±1.0 by weight. |
| Yeast extract | 3.0 parts±2.0 by weight. |
| Lysine | 10.0 parts±0.8 by weight. |
| Dextrose | 1.0 parts±0.5 by weight. |
| Agar | 6.0 parts±0.3 by weight. |
| Brom Cresol-Purple | 0.02 parts±0.001 by weight. |
| Water | 1000 parts by weight. |

Tube B

| | |
|---|---|
| Peptone | 20.0 parts±1.0 by weight. |
| Yeast extract | 3.0 parts±2.0 by weight. |
| L.-ornithine | 5.0 parts±1.0 by weight. |
| Tryptophan | 5.0 parts±1.0 by weight. |
| Dextrose | 1.0 parts±0.5 by weight. |
| Agar | 15.0 parts±0.5 by weight. |
| Brom Cresol-Purple | 0.02 parts±0.001 by weight. |
| Water | 1000 parts by weight. |

| Tube C—Citrose/rhamnose | High | Range, gms./l. water, preferred | Low |
|---|---|---|---|
| Butt: | | | |
| Tryptone | 10.0 | 3.0 | 0.5 |
| Sodium chloride | 8.0 | 7.5 | 1.0 |
| Dipotassium phosphate | 1.0 | 0.45 | 0.1 |
| Agar | 17.0 | 15.0 | 2.5 |
| Brom thymol blue | 1.0 | 0.12 | 0.01 |
| Rhamnose | 15.0 | 5.0 | 2.0 |
| pH | 7.8 | 7.1 | 6.5 |
| Slant: | | | |
| Ammonium dihydrogen phosphate | 3.0 | 1.0 | 0.5 |
| Dipotassium phosphate | 3.0 | 1.0 | 0.5 |
| Sodium chloride | 8.0 | 5.0 | 1.0 |
| Sodium citrate | 3.0 | 2.0 | 0.5 |
| Magnesium sulfate | 0.5 | 0.2 | 0.09 |
| Agar | 17.0 | 15.0 | 2.5 |
| Brom thymol blue | 1.0 | 0.08 | 0.01 |
| pH | 7.4 | 6.9 | 6.4 |

| Tube D—Soranese | High | Range, gms./l water, preferred | Low |
|---|---|---|---|
| Butt (lower chamber): | | | |
| Peptone | 10.0 | 2.0 | 0.5 |
| Sodium chloride | 8.0 | 5.0 | 1.0 |
| Dipotassium phosphate | 1.0 | 0.6 | 0.1 |
| Agar | 17.0 | 14.5 | 2.5 |
| Brom Tyhmol Blue | 0.08 | 0.03 | 0.01 |
| Brom Cresol Purple | 0.015 | 0.01 | 0.005 |
| Arabinose | 10.00 | 3.0 | 0.5 |
| pH | 8.0 | 7.4 | 6.7 |
| Slant (upper chamber): | | | |
| Desoxyribonuleic acid | 5.0 | 2.0 | 0.2 |
| Peptone | 30.0 | 15.0 | 3.0 |
| Sodium chloride | 8.0 | 5.0 | 1.0 |
| Agar | 18.0 | 15.0 | 2.5 |
| Raffinase | 20.0 | 12.0 | 4.0 |
| Sorbital | 5.0 | 2.0 | 0.1 |
| Brom Cresol Purple | 0.1 | 0.04 | 0.02 |
| Phenol Red | 0.02 | 0.008 | 0.003 |
| Toludine Blue O | 0.09 | 0.03 | 0.01 |
| pH | 8.0 | 7.4 | 6.7 |

There has been disclosed heretofore the best emodiment of the invention presently contemplated. However, it is to be understood that various changes and modifications may be made by those skilled in the art without departing from the spirit of the invention.

What I claim is:

1. An enteric bacilli differentiation apparatus comprising a plurality of transparent tubes having upper and lower chambers joined by a conduit of reduced cross-sectional area containing media in the upper and lower chambers separated by the conduit for making determinations responsive to selected enteric bacteria wherein:
    (a) one of said tubes contains media having a slant portion and a butt portion in the upper chamber for phenylalanine, lactose, H₂S and glucose determinations and the lower chamber contains media for lysine determinations;
    (b) another of said tubes contains media in the upper chamber for indole determination and the lower chamber contains media for ornithine and motility determinations; and
    (c) another of said tubes contains media for citrate determination in the upper chamber and media for rhamose determination in the lower chamber.

2. The apparatus of Claim 1 including a fourth said tube containing media in the upper chamber for DNASE, Raffinose and Sorbital determinations and media in the lower chamber for Arabinose determinations.

3. The apparatus of Claim 1 wherein said conduits contain a gas separating the contents of the respective upper and lower chambers.

4. An enteric bacilli differentiation apparatus containing media in combination comprising;
    (I) a first transparent container comprising a first chamber and a second chamber joined by a conduit of reduced cross-sectional area containing a first media in said first chamber and a second media in said second chamber spaced from said first media by said conduit;
        (a) said first media comprising a gel non-toxic to the bacilli to be differentiated having dispersed therein:
            (1) sufficient nutrient to support the growth of bacilli to be differentiated;
            (2) sufficient amino acid and a sufficient source of ferric ions to provide an indication of deamination of the amino acid by selected bacilli;
            (3) sufficient carbohydrate to provide an indication of fermentation and to act as a catalyst for decarboxylation;
            (4) a source of sulphur for enhancing production H₂S in the presence of selected bacilli; and
            (5) Brom Cresol-Purple; and
        (b) said second media comprising a gel containing lysine and including means for the detection of the decarboxylation of the lysine in the presence of bacilli causing the decarboxylation of the lysine;
    (II) a second transparent container having a gelled media therein comprising:
        (a) a nutrient for the bacilli to be differentiated;
        (b) sufficient L-Ornithine to provide an indication of decarboxylation by selected bacilli;
        (c) sufficient tryptophane to provide indole upon degradation by selected bacilli; and
        (d) carbohydrate; and
    (III) a transparent container having an upper and a lower chamber connected by a conduit of reduced cross-sectional area; said upper chamber containing

| | Gms./l. water |
|---|---|
| Ammonium dihydrogen phosphate | 0.5–3 |
| Dipotassium phosphate | 0.5–3 |
| Sodium chloride | 1–8 |
| Sodium citrate | 0.5–3 |
| Magnesium sulfate | 0.09–0.5 |
| Agar | 2.5–17.0 |
| Brom Thymol Blue | 0.01–1.0 |
| pH 6.4–7.4. | | said lower chamber containing

| | |
|---|---|
| Tryptone | 0.5–10.0 |
| Sodium chloride | 1.0–8.0 |
| Dipotassium phosphate | 0.1–1.0 |
| Agar | 2.5–17.0 |
| Brom Thymol Blue | 2.1–15.10 |
| pH 6.5–7.8. | |

5. The apparatus of Claim 4 comprising in combination a further transparent container having an upper and a lower chamber connected by a conduit of reduced cross-sectional area;

(a) said lower chamber containing:

| | Gms./l. water |
|---|---|
| Peptone | 0.5–10.0 |
| Sodium chloride | 1.0–8.0 |
| Dipotassium phosphate | 0.1–1.0 |
| Agar | 2.5–17.0 |
| Brom Thymol Blue | 0.1–0.08 |
| Brom Cresol Purple | 0.005–0.015 |
| Arabinose | 0.5–10.00 |
| pH 6.7–8.0. | | and (b) said upper chamber containing:

| | |
|---|---|
| Desoxyribonuleic acid | 0.2–5.0 |
| Peptone | 3.0–30.0 |
| Sodium chloride | 1.0–8.0 |
| Agar | 2.5–18.0 |
| Raffinase | 4.0–20.0 |
| Sorbital | 0.1–5.0 |
| Brom Cresol Purple | 0.02–0.1 |
| Phenol Red | 0.003–0.02 |
| Toludine Blue O | 0.01–0.09 |
| pH 7.4–8.0. | |

6. The apparatus of Claim 5 wherein said conduits contain a gas separating the contents of the respective upper and lower chambers.

7. An enteric bacilli differentiation apparatus comprising:
  (I) A first constricted transparent tube having upper and lower chambers joined by a conduit of smaller cross-sectional area, its upper portion containing a first medium and in its lower portion a second medium;
    (a) said first medium comprising a gel non-toxic to the bacilli to be differentiated having dispersed therein;
      (1) sufficient nutrient to support the growth of bacilli to be differentiated;
      (2) sufficient amino acid and a sufficient source of ferric ions to provide an indication of deamination of the amino acid by selected bacilli;
      (3) sufficient carbohydrate to provide an indication of fermentation and to act as a catalyst for decarboxylation;
      (4) a source of sulphur for enhancing production of H$_2$S in the presence of selected bacilli; and
      (5) Brom Cresol-Purple; and
    (b) said second medium comprising a gel containing lysine and including means for the detection of the decarboxylation of the lysine in the presence of bacilli causing the decarboxylation of the lysine; and
  (II) A second constricted transparent tube having upper and lower chambers joined by a conduit of reduced cross-sectional area containing:
    (a) In the upper and lower chambers, a solid medium for simultaneous indole decarboxylation reactions of amino acids and motility comprising:
      (1) nutrient;
      (2) a solidifying agent;
      (3) Brom Cresol-Purple;
      (4) A material capable of being fermented and producing an acid in the presence of enteric bacteria; and
      (5) at least two different amino acids, namely Ornithine and Tryptophan.
  (III) A third constricted transparent tube having upper and lower chambers joined by a conduit of reduced cross-sectional area; said upper chamber containing

| | Gms./l. water |
|---|---|
| Ammonium dihydrogen phosphate | 0.5–3 |
| Dipotassium phosphate | 0.5–3 |
| Sodium chloride | 1.–8. |
| Sodium citrate | 0.5–3 |
| Magnesium sulfate | 0.09–0.5 |
| Agar | 2.5–17.0 |
| Brom Thymol Blue | 0.01–1.0 |
| pH 6.4–7.4. | | said lower chamber containing

| | |
|---|---|
| Tryptone | 0.5–10.0 |
| Sodium Chloride | 1.0–8.0 |
| Dipotassium Phosphate | 0.1–1.0 |
| Agar | 2.5–17.0 |
| Brom Thymol Blue | 2.1–15.0 |
| pH 6.5–7.8. | |

8. The apparatus of Claim 7 wherein said conduits contain a gas separating the contents of the respective upper and lower chambers.

9. The apparatus of Claim 7 comprising in combination a further transparent container having an upper and a lower chamber connected by a conduit of reduced cross-sectional area;

(a) said lower chamber containing:

| | Gms./l. water |
|---|---|
| Peptone | 0.5–10.0 |
| Sodium chloride | 1.0–8.0 |
| Dipotassium phosphate | 0.1–1.0 |
| Agar | 2.5–17.0 |
| Brom Thymol Blue | 0.1–0.08 |
| Brom Cresol Purple | 0.005–0.015 |
| Arabinose | 0.5–10.00 |
| pH 6.7–8.0. | | and (b) said upper chamber containing:

| | |
|---|---|
| Desoxyribonuleic acid | 1.2–5.0 |
| Peptone | 3.0–30.0 |
| Sodium chloride | 1.0–8.0 |
| Agar | 2.5–18.0 |
| Raffinase | 4.0–20.0 |
| Sorbital | 0.1–5.0 |
| Brom Cresol Purple | 0.02–0.1 |
| Phenol Red | 0.003–0.02 |
| Toludine Blue O | 0.01–0.09 |
| pH 7.4–8.0. | |

References Cited

Auxotab Catalog, Colab Laboratories Inc., 1971.

A. LOUIS MONACELL, Primary Examiner
R. J. WARDEN, Assistant Examiner

U.S. Cl. X.R.

195—103.5 R, 139, 54